United States Patent [19]

Anderson

[11] Patent Number: 5,325,627
[45] Date of Patent: Jul. 5, 1994

[54] WEED CONTROL DEVICE FOR POTTED PLANTS

[76] Inventor: Charles E. Anderson, 3904 Retama, Victoria, Tex. 77901

[21] Appl. No.: 31,485

[22] Filed: Mar. 15, 1993

Related U.S. Application Data

[63] Continuation-in-part of Ser. No. 931,958, Aug. 19, 1992.

[51] Int. Cl.⁵ ............................................. A01G 9/02
[52] U.S. Cl. ............................................. 47/84; 47/9; 47/25; 206/423
[58] Field of Search .............. 47/84, 95, 25 R, 84 C, 47/9 S; 206/423

[56] References Cited

U.S. PATENT DOCUMENTS

| | | | |
|---|---|---|---|
| 1,886,690 | 11/1932 | Janssen | 47/84 C |
| 1,988,307 | 3/1933 | Fay . | |
| 2,102,748 | 12/1937 | Rocquin | 47/25 R |
| 3,299,566 | 1/1967 | MacMullen | 47/9 S |
| 3,755,965 | 9/1973 | Emery . | |
| 3,769,748 | 11/1973 | Goldring . | |
| 4,023,308 | 5/1977 | Staby . | |
| 4,087,938 | 5/1978 | Koch . | |
| 4,242,835 | 1/1981 | Sorribes | 47/84 C |
| 5,048,228 | 9/1991 | Neveu et al. | 47/9 C |
| 5,058,317 | 10/1991 | McMurtrey | 47/9 S |

FOREIGN PATENT DOCUMENTS

| | | | |
|---|---|---|---|
| 0182453 | 5/1986 | European Pat. Off. | 206/423 |
| 2106936 | 5/1987 | Japan | 47/9 S |

*Primary Examiner*—Carl D. Friedman
*Assistant Examiner*—Christopher Todd Kent
*Attorney, Agent, or Firm*—Richard C. Litman

[57] ABSTRACT

A device for mechanically checking the growth of noxious weeds within the growing containers of potted plants is shown. The device includes a mat of porous construction adapted to fit within the open top of a pot and engage a side wall thereof for inhibiting weed growth by shading the pot interior from light. A retainer, for positioning atop the mat, frictionally engages a side wall of the pot and retains the mat securely within the open top thereof. The pot may be provided with an overhanging and inwardly directed lip proximate the top of its side wall for engaging the retainer and locking such in place. In an alternative embodiment of the device, the retainer is formed as a ring, having an inverted U-shaped cross section, integrally joined to the outer edge of the mat for frictionally securing the mat to the pot. The device may also be provided with one or more chemical treatments such as herbicides, insecticides, fungicides, and fertilizers for promoting the growth of specified plant materials.

15 Claims, 4 Drawing Sheets

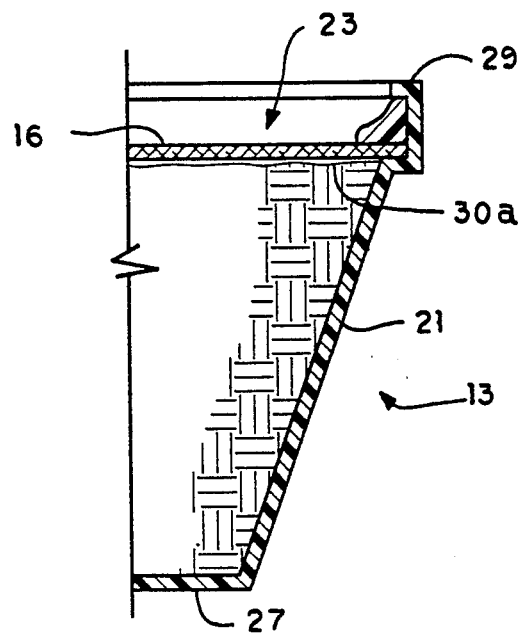
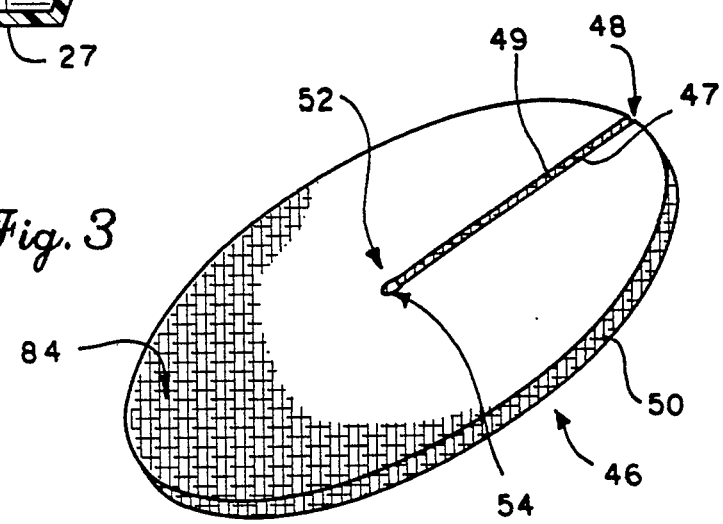
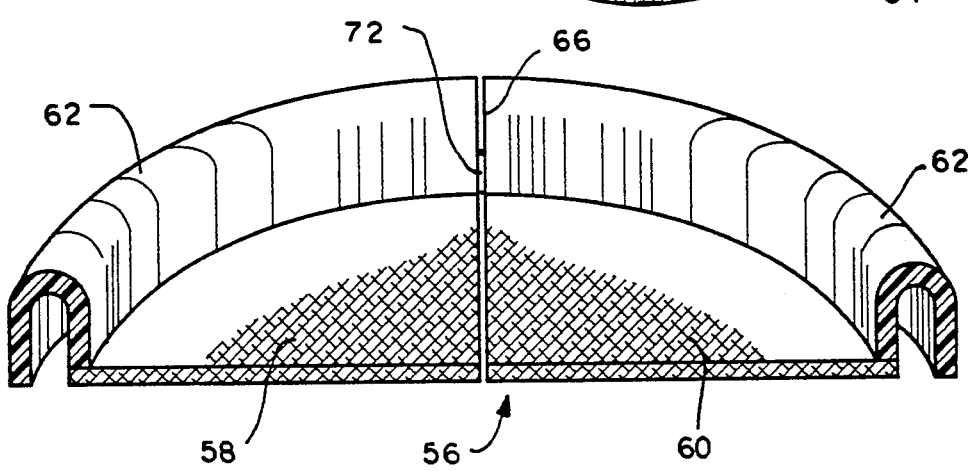

WEED CONTROL DEVICE FOR POTTED PLANTS

This application is a continuation in part of application Ser. No. 07/931,958 filed Aug. 19, 1992.

FIELD OF THE INVENTION

The present invention relates generally to plant husbandry. In particular, a device for mechanically checking the growth of noxious weeds within the growing containers of potted plants is shown. The device also be provided with one or more chemical treatments such as herbicides, insecticides, fungicides, and fertilizers to further expand its range of use and enhances its utility.

BACKGROUND OF THE INVENTION

Of the plant materials grown for sale, transplanting, or experimentation by commercial landscape nurseries, the majority are now developed in containers on top of the ground surface. Container grown plant materials are known for their high survival rates and low production costs. The containers, usually filled with an admixture of soils and plant nutrients, provide an ideal environment for rapid plant growth. In addition to collecting water and retarding evaporation, the containers shield the plant roots from animal attack, provide some insulation from temperature extremes, and furnish a means for readily moving the plant material from place to place without resort to time consuming and manpower intensive digging or trenching activities.

Despite the best efforts of many nurserymen, contaminated soil mixtures, wind, and animals contribute to the addition of unwanted plants to nursery stock growing containers. Weeds deposited in these containers thrive and, if left unchecked, have a tendency to smother their more valuable neighbors. Weeds not only reduce the amount of sunlight reaching the desired plant materials, slowing their growth rates, but rob the soil of essential nutrients critical to plant development.

Commercial nurserymen have attempted to control the growth of weeds which may develop in containers; however, not with any particular success. Isolation of containers and growing media from weed sources, especially in large scale nursery operations, has been found to be impractical. Physically removing weeds as they sprout is highly labor intensive and inefficient. Therefore, many growers have resorted to the use of costly chemical herbicides for controlling weed growth in their planting containers.

Samples of air, soil, and water taken from locations remote from nurseries which have utilized chemical herbicides over time have included trace amounts of such herbicides. Although the herbicides employed in the United States have been subjected to stringent regulatory testing and approval, the long-term effects on man and the environment are, as yet, unknown. Limiting exposure to such toxic chemicals, however, seems reasonable, and any reduction in the amount of these chemicals leaching from the area of their intended use would undoubtedly be highly beneficial.

Heretofore, the use of mechanical weed barriers, capable of controlling weed growth without large investitures in terms of manpower or chemical herbicides, has been restricted to the use resilient sheets for covering large areas of ground surface. Some of these so-called agrotextile sheets are known to have porous structures permeable to water and air while others are of flexible and impermeable plastic having a closed structure. While the permeable sheets permit water to pass into the ground limiting surface runoff, their interconnected pore spaces are generally so small as to prevent most growing plant shoots from passing therethrough. Furthermore, many agrotextile materials prevent the passage of light thereby inhibiting the growth of plants having the agrotextile placed between such and a light source. The use of such materials in applications involving plant growing containers is believed to be novel and would be greatly beneficial to many nurserymen who would find it desirable to have a device which would control weeds with a minimal use of expensive herbicides, often ineffective for their intended purposes, difficult to apply, and potentially harmful to the environment.

DESCRIPTION OF THE RELATED ART

A number of disk shaped bodies have been developed for placement in, or upon, the ground surface for encouraging the growth of plants. Many of these bodies store and transmit water to the growing plant when needed. Others cover the soil to prevent animal attack. None are adapted, however, to engage the open top of a plant growing container or pot to inhibit the growth of unwanted plants therein.

For instance, U.S. Pat. No. 1,988,307, issued Jan. 15, 1935 to Temple Fay, discloses a cake-like body of water absorbent, decayed vegetable matter, such as peat moss, and fertilizer, cohered by pressure or a binder, or both, so that it will rapidly absorb and retain moisture.

U.S. Pat. No. 3,755,965, issued Sep. 4, 1973 to Dan D. Emery, teaches the construction of a plant watering and fertilizing device including: a bowl having a tubular depending root protector portion disposed at the center thereof; a dish-like, two-piece cover having an upstanding tube-like shield disposed st the center thereof and removably positioned atop the bowl; and, a fertilizer cake adapted to fit snugly within the bowl. When used, water falling on the cover tends to collect therein and flows by gravity through a plurality of ports adjacent the shield into the cistern. Water then passes through the cake and is directed into the soil surface adjacent a growing plant by the root protector portion. U.S. Pat. No. 3,769,748, issued Nov.6, 1973 to John E. Goldring, provides a plant watering device including an expanded foam pad serving as a wick in absorbing, holding and transferring moisture from a water reservoir to a potted plant supported on the pad's upper surface. A dis-like cover having a central opening forms a ring about the base of the potted plant and extends to the side wall of the water reservoir to prevent evaporation therefrom. A second opening is provided ion the cover to permit water to be poured into the reservoir.

U.S. Pat. No. 4,023,308, issued May 17, 1977 to George L. Staby, describes a foraminous body having a plurality of vertically disposed perforations placed therein for providing an improved growing medium for potted plants.

U.S. Pat. No. 4,087,938, issued May 9, 1978 to James P. Koch, shows a tree watering device including a radially slotted tub adapted to engage around the trunk of a tree and deliver water to the roots thereof in a controlled manner. A plurality of extension tubes of any suitable length extend from the tub to deliver water to areas remote from the tree trunk.

None of the above described inventions and patents, taken either singly or in combination, is seen to describe the instant invention as claimed herein.

SUMMARY OF THE INVENTION

A device for mechanically checking the growth of noxious weeds within the growing containers of potted plants is disclosed herein, and it is a principle object thereof to provide a device for controlling the growth of weeds in a growing container by shading the interior thereof from light.

It is another object of the invention to provide a device having a mat of porous construction, adapted to fit within the open top of the pot and engage a side wall thereof, for shading the pot interior from light.

It is a further object of the invention to provide a retainer for holding the mat securely within the open top of the pot.

Still another object of the invention is provided the pot with an overhanging and inwardly directed lip proximate the top of its side wall for engaging the retainer and locking such in place.

It is an object of the invention to provide improved elements and arrangements thereof in an apparatus for the purposes described which is inexpensive, dependable and fully effective in accomplishing its intended purposes.

It is a further object of the present invention to provide a weed control mat having an integral retainer ring with an inverted U-shaped cross section for frictionally securing the mat to the pot.

It is an additional object of the present invention to provide a water permeable mat for positioning within or upon a plant growing container or pot with one or more water soluble chemical treatments such as herbicides, insecticides, fungicides, and fertilizers for protecting and promoting the growth of specified plant materials.

These and other objects of the present invention will become readily apparent upon further review of the following specification and drawings.

BRIEF DESCRIPTION OF THE DRAWINGS

FIG. 2A is a cross sectional detail view of the device of FIG. 1 showing a pot having an overhanging lip for engaging the retainer of the present invention;

FIG. 3 is a perspective view of a first alternative embodiment of a mat for mechanically checking the growth of noxious weeds within a growing container in accordance with the present invention;

FIG. 4 is a perspective view of a second alternative embodiment of a mat for mechanically checking the growth of weeds within growing container in accordance with the present invention having a portion cut away to show details thereof;

Similar reference characters denote corresponding features consistently throughout the attached drawings.

DETAILED DESCRIPTION OF THE PREFERRED EMBODIMENTS

Figure 1:
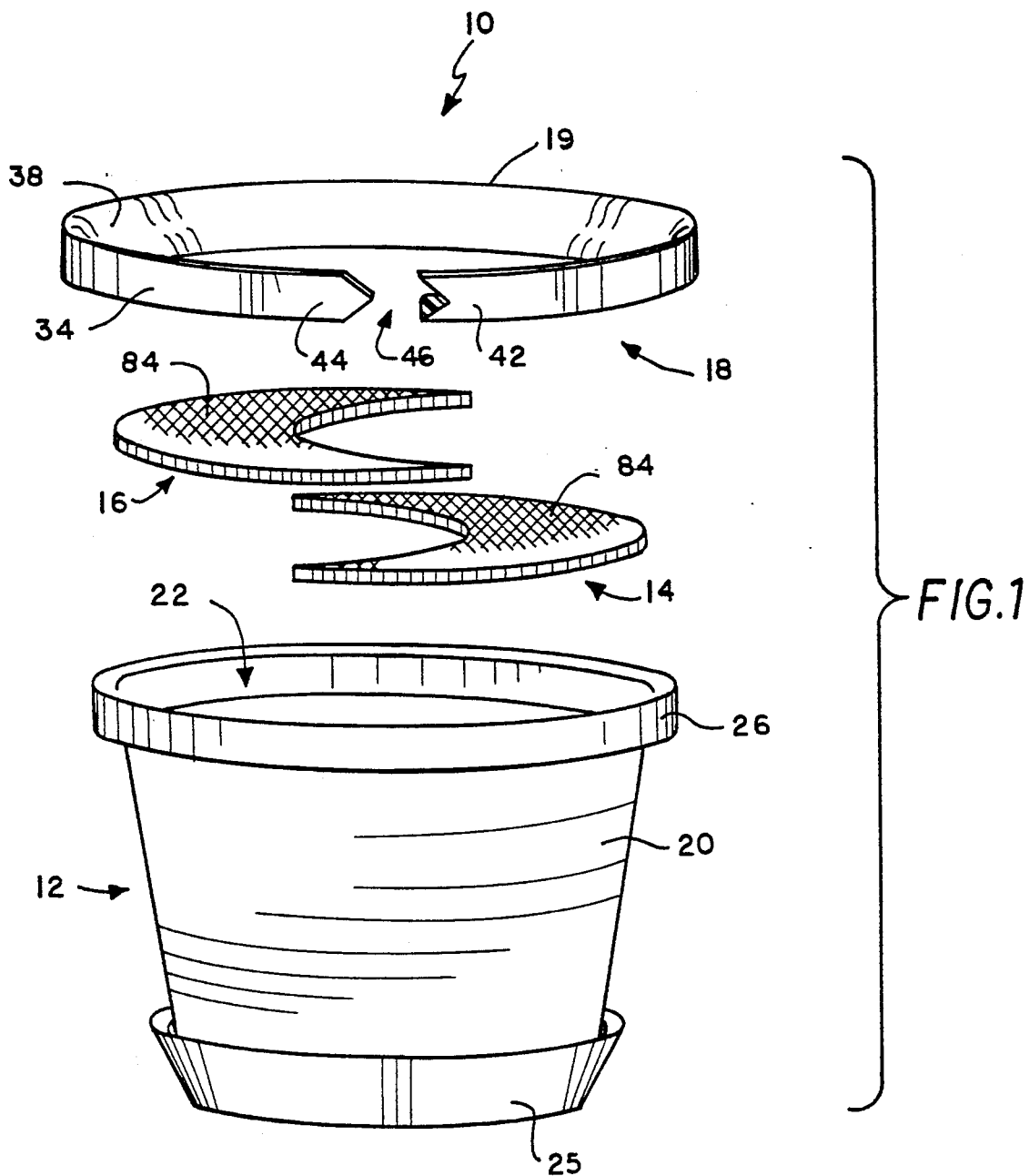
FIG. 1 is an exploded perspective view showing the component parts of the device of the present invention.

Referring to FIG. 1 a weed control device for potted plants 10 in accordance with the present invention may be seen. Weed control device 10 includes: a growing container or pot 12 for horticultural purposes; two similarly shaped weed control mats 14 and 16 adapted to fit inside pot 12; and, a retainer 18 adapted to be positioned atop mats 14 and 16 for holding such within pot 12 and against the soil surface.

Container or pot 12 may fabricated from terra cotta, peat moss, or papier-mache, but is preferably formed from one of a number of weatherproof plastic materials known for their ability to withstand great strain without tearing or breaking such as polyethylene. Pot 12 will include side walls 20, an open top 22, and a bottom wall 24. Side walls 20 may be further provided with a reinforced aperture margin or lip 26 for decorative and strength enhancing purposes. Shown centrally positioned in bottom wall 24 is a single drain hole 28 for the removal of excess water from within pot 12. Nevertheless, the number of drain holes provided in bottom wall 24 is not critical to the function of the present invention, and wall 24 may be constructed with any number of such holes provided that they are of sufficient diameter to permit adequate water drainage from the interior of pot 12 during use. A drainage dish 25 adapted to receive pot 12 may be positioned beneath drain hole 28 to receive liquids exiting therefrom.

An admixture of soils and other plant nutrients 30 will normally be deposited within pot 12 and will extend from bottom wall 24 to a point proximate open top 22. Such soil mixtures are well known and are widely varied to suit the growing requirements of the particular plants placed therein. Soil material 30 will preferably, however, provide adequate water and oxygen to the roots of a growing plant as shown at 32.

Mats 14 and 16 may be fabricated in a variety of configurations and, in use, will be positioned upon or above the soil surface within pot 12. Preferably, mats 14 and 16 are provided with a crescent shape, approximating the figure of the moon as it appears in its first quarter with concave and convex edges terminating in points. The crescent shape has been found to accommodate most nursery pots on the market today having a round cross-sectional configuration as is reflected in pot 12. On the other hand, it is anticipated that mats 14 and 16 may be given a geometrical configuration more closely resembling a rectangle so as to accommodate a pot having a square cross section. Other geometrical shapes, dependent upon the configuration of the container being utilized, are possible. Obviously, the mats 14 and 16 may be fabricated in a variety of sizes so as to snugly fit within containers or pots of varying size.

Agrotextiles, typically unspooled from large bolts or rolls, have been employed by the landscape nursery industry to inhibit weed growth upon large areas of ground surface. It has been found, however, that agrotextiles materials of natural origin, such as the fiber obtained from the jute plant, possess a relatively short life span when placed upon the ground surface. Jute and similar fibers have a tendency to undergo organic decomposition through the action of various fungi, bacteria, and microorganisms and rapidly become useless.

Preferably, then, weed control mats 14 and 16 are formed of a woven, knitted, or nonwoven agrotextile material such as that described in U.S. Pat. No. 5,048,228, issued Sep. 17, 1991 to Jean L. Neveu et al. This weatherproof material comprises a resilient sheet, permeable to both air and water, adapted for placement sheet upon the ground surface. Experience with this product in the field has shown that it is easy to work, has a multi-year life, and resists degradation from exposure to ultraviolet radiation.

Similar agrotextiles comprising plastics materials such as polyethylene or polypropylene may be utilized in the instant invention with equal facility. When woven or knitted, these materials possess many of the attributes of the '228 agrotextile. When molded or otherwise manufactured as a substantially continuous sheet of nonwoven material, which may be perforated to allow the passage of air, water and light, an inexpensive, albeit less durable, agrotextile for use in the instant invention is obtained.

The preferred crescent shaped mats may be cut from stacked sheets of agrotextile material in great numbers with well known reciprocating tools capable of simultaneously applying heat to the newly cut edges thereof. Heat treatment of the edges of the mats adheres the man-made fibers to one another and extends the useful life of the mat by preventing the undesirable fraying and unraveling of thr agrotextile material. It has been found that by quickly passing the mat edges before an open flame, a virtually fray proof mat can be produced. Alternatively, glues may be applied to the mat edges to bind the warp and woof threads of the agrotextile with similar results.

Figure 2:
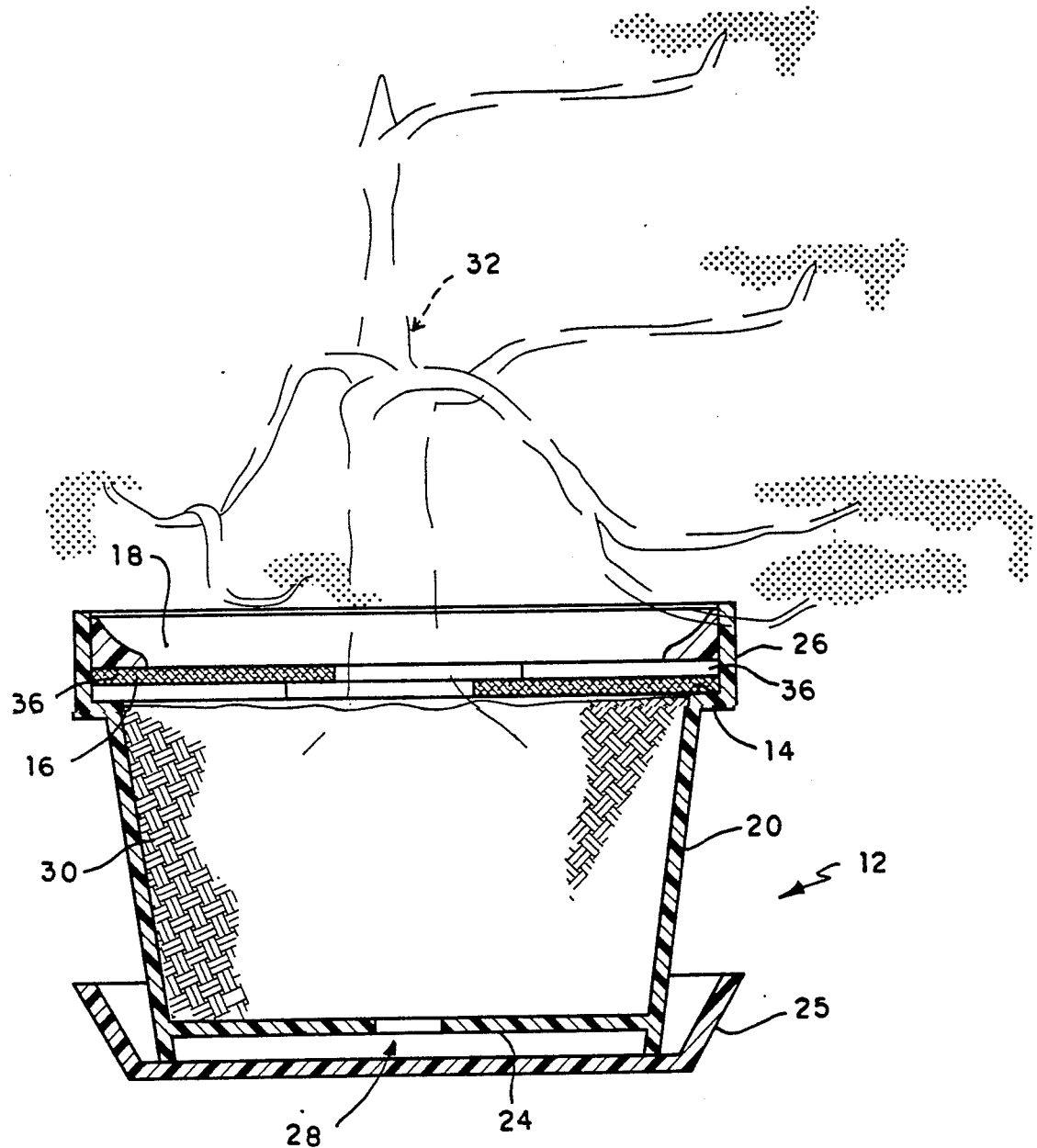
FIG. 2 is a cross sectional view of the device of FIG. 1 with a growing plant positioned therein.

As may be seen in FIGS. 1 and 2, retainer 18 has a circular configuration for accommodating pot 12 having a similarly shaped open top 22, and a substantially L-shaped cross section for anchoring mats 14 and 16 therein. Retainer 18 may be molded or otherwise formed from a variety of plastics materials known for their resilience, durability and weather-resistance. Preferably, retainer 18 comprises a polyvinyl chloride (PVC) composition displaying the aforesaid desirable physical characteristics.

Side, bottom, and inclined surfaces delineate the outline of retainer 18. Retainer 18 includes a substantially vertical side wall or surfaces 34 circumscribing and defining the lateral bounds of retainer 18. Further, retainer 18 has a substantially horizontal bottom wall or surface 36 of circular shape. Surface 36 is adapted to retain mats 14 and 16 upon the surface of soil material 30 placed in pot 12. Further, as mats 14 and 16 may be placed within pot 12 with a certain amount of variation to accommodate different plantings, surface 36 insures that the soil surface will be covered even if the mats do not fully abut side wall 20. An inclined wall or surface 38 joins walls 34 and 36 in a triangular configuration. Surface 38 is adapted to slope toward the center of open top 22 thereby directing water and other fluids applied to open top 22 toward the roots of plant 32 and away from side wall 20. In this fashion, water utilization by growing plant 32 may be maximized and water loss through evaporation reduced.

The diameter of retainer 18 may be varied. An opening 40 permits the relative distance between opposed retainer ends 42 and 44 to be increased or decreased when a slight pulling or pushing force is respectively applied thereto. Opening 40 is preferably V-shaped and forms a tight interlocking joint when ends 42 and 44 are fitted together in dovetail fashion. The "V" shape of the opening is, of course, provided by the arrangement of the opposed retainer ends wherein end 42 is seen to be indented and end 44 is seen to protrude as a mated counterpart. To one skilled in the art, it may be appreciated that other interlocking arrangements for the ends 42 and 44 may be provided thereto capable of permitting retainer 18 to be manipulated and then locked in an equally stable manner or condition.

When used together, mats 14 and 16 are positioned about the trunk of a potted plant 32 so as to completely cover the surface of soil mixture 30 positioned in pot 12 as may be seen in FIG. 1. The crescent shaped mats overlap in a manner so as to accommodate plants having multiple trunks or limbs extending from the soil surface as well as plants growing distally from the center of pot 12. Next, retainer 18 is slightly compressed, reducing its diameter, and inserted into open top 22 of pot 12 such that retainer 18 resets upon mats 14 and 16. When retainer 18 is permitted to spring back into its unstrained orientation, by the removal of the compressive force, against side wall 22 of pot 12, and ends 42 and 44 are fitted together in dovetail fashion, mats 14 and 16 are effectively locked in place. Weed growth is thus abated as light, prevented from reaching the soil surface and any weed seeds which may happen to germinate therein, cannot drive the process of photosynthesis for continued botanical maturation of weeds.

In FIG. 2A may be seen a pot 13 having a side wall 21, an open top 23, bottom wall 27, and an overhanging and inwardly directed lip 29 proximate the top of side wall 21. Mat 16 of porous construction is seen fitted within open top 23 upon soil surface 30a and engaged with side wall 21. Retainer 18, positioned atop mat 16 and fitted beneath lip 29, effectively locks mat 16 within pot 13 such that high winds or pot upset will not move mat 16 from its chosen position.

FIG. 3 illustrates a first alternative embodiment of a mat for mechanically checking the growth of noxious weeds within a growing container or pot 46. Mat 46 includes a substantially flat piece of agrotextile material, formed and heat treated about its perimeter in the manner described hereinabove for mats 14 and 16. As shown, mat 46 has a circular outline adapted to fit snugly within the open top of a container or pot as at 22 in FIG. 1. Two opposed radial edges 47, 49 define a radial cut 48 that extends from outer edge 50 of mat 46 to the center 52 thereof allows the mat to be positioned within a pot having a plant growing therein. At center 52, a circular cut-out 54 may be provided to fit tight about the trunk of such a plant wherein the agrotextile material will be permitted to lay flat upon the soil surface in a normally smooth manner without furrows, ridges or creases. An off-center planting may be readily accommodated by rotating mat 46 within the open top of the pot so that radial cut 48 is positioned upon the appropriate radius extending from the center of the pot to its outer edge, such as side wall 20, including the trunk of the off-center plant. Mat 46 may be also provided with other geometrical outlines or configurations to fit a pot having a noncircular open top, and may be fabricated in a variety of sizes so as to snugly fit within containers or pots of varying size. In use, mat 46 may be secured within a pot by retainer 18.

It can be readily inferred that the first alternative mat embodiment 46 may be utilized in a manner similar to that of mats 14 and 16. Rather than positioning two separate mat components upon the ground surface and about a growing plant, however, only one such component need be utilized to cover the entirety of the soil surface. Retainer 18 would, nevertheless, be employed to hold mat 46 securely within the desired pot. Because of the absence of light penetrating the agrotextile material, and reaching the soil surface beneath mat 46, photosynthesis is prevented and weed growth stopped.

FIG. 4 is a perspective view of a second alternative embodiment of a mat for mechanically checking the growth of weeds within a growing container or pot 56. Mat 56 includes two semi-circular panels 58 and 60 of agrotextile material, formed and heat treated as described hereinabove, positioned in a side-by-side relationship so as to describe a circle. A retainer ring 62 formed of a resilient and semi-rigid plastics material and having an inverted U-shaped cross section is integrally joined to the panels 58 and 60 about the respective arcs formed by the curved outer edges of the panels. Adhesives and heat bonding methods, among other means, may be employed to join ring 62 and panels 58 and 60.

Retainer ring 62 is separated into two equally sized parts by vertically oriented joints or cuts, as at 66, at the junction between panels 58 and 60. Cut 66 is preferably only partially divided, retaining a hinge 72 of uncut material upon the outer surface of ring 62 for holding mat 56 together as a single easy-to-work unit. On the other hand, the cut opposite cut 66 (not shown) penetrates through ring 62 and separates or divides such so that the newly formed edges 68 and 70 may be pulled apart with the slight application of force. As ring 62 is constructed of a resilient plastics material, hinge 72 may be opened and closed in such a manner so as to permit mat 56 to be readily positioned upon a pot, as at 12, having a growing plant positioned therein. Separate retaining ring 18 is not needed to secure mat 56 within a pot as integral ring 62 may be pressed over the aperture margin or lip of a pot as at 26 in FIG. 1 and held in place by the resulting friction fit of ring 62 upon the lip of the pot.

Cut 66 may also be made in such a way so as to penetrate through ring 62 separating and dividing mat 56 into two halves of identical construction. These halves, it is believed, would stack for storage and transport purposes in a configuration of minimal cross sectional area and may be fastened to the lip of a pot in the manner described above. As may be seen in FIG. 5, the halves 74 and 76 may be given a crescent shape, similar to that provided to mats 14 and 16 in order to allow the halves to overlap slightly when positioned adjacent a plant in a pot during use. When installed upon an appropriately sized pot, the respective ring portions 78 and 80 of halves 74 and 76 would overlap slightly upon the lip of the pot to which they are fitted.

Figure 5:
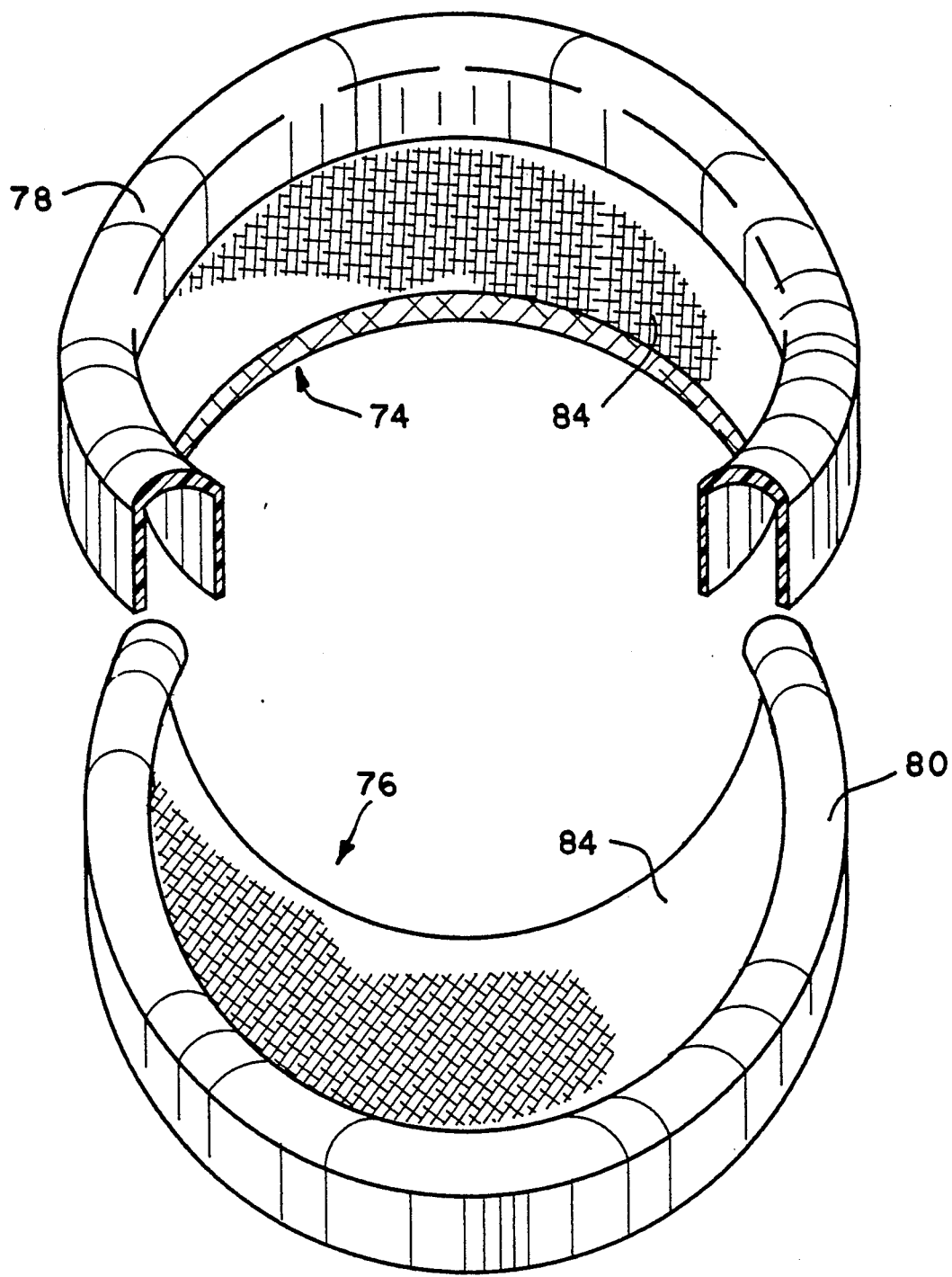
FIG. 5 is a perspective view of a third alternative embodiment of a mat for mechanically checking the growth of weeds within a growing container in accordance with the present invention.

The embodiments of the present invention shown in FIGS. 4 and 5 provide a certain amount of added convenience by their lack of a separate retainer. Furthermore, these embodiments may be positioned upon a pot such that gap between the mat and the soil surface is formed. This gap has been found to be advantageous in that weed seeds which happen to fall upon the mat surface are prevented from drawing any moisture from the soil material and away from the desirable container grown plant. As one of the necessary products required for germination is withheld from the weed seeds, sprouting thereof is stopped. If germination of the weed seed does occur, the lack of moisture provided thereto will quickly lead to its demise.

The best way to keep container grown plant materials healthy is to provide the proper growing conditions for their development. Most troubles in this regard are due to improper care. The most common causes of disease result from poor cultivation practices including: excessively dry or humid air, lack of air movement among crowded plants, and overwatering. It is generally easy to deal with such problems once they are identified. However, attack by a wide range of pests is more difficult to guard against. In certain circumstances, it is all but impossible to treat such problems without resort to chemical treatments. Nevertheless, the amount of chemicals employed to perform the required task can be minimized.

The mats of the instant invention may be provided with one or more chemical treatments including: insecticides, fungicides, fertilizers, and herbicides. Prior to installation within a growing container, an placement upon the ground surface, mats 14, 16, 46, 56, 74, and 76 may be exposed to one or more chemical treatments 84 which may further include a binder to retain the active chemical compounds thereto. Exposure may be furnished in the form of a mass dispersed droplets as from a jet nozzle or a through wetting by immersion in a liquid for a period of time. In addition to providing a layer of covering material upon the outer surface of the mat, the applied chemical treatment may also be taken into the pores or interstices thereof and retained there. In either case, it is preferred that a mat, once exposed to the chemical treatment, be allowed to dry to the point where it becomes substantially free of moisture or liquid content. The chemical residue or coating remaining upon the mat may be used to treat various nursery problems when leached therefrom during normal plant watering operations and enhance the growth of the desirable plant material.

One skilled in horticultural endeavors would be aware of the fact that a multitude of chemicals may be employed in the instant invention in the manner suggested hereinabove. By way of example only, the compound, acephate, described in U.S. Pat. Nos. 3,716,600 and 3,914,417 and sold under the trademark "Orthene" by a subsidiary of Chevron Chemical Company, may be used as a systemic insect killing agent or insecticide. Triforine sold by Chevron under the trademark "Funginex," on the other hand, may be used as a fungus killing agent or fungicide. Triforine has been found to be particularly useful in eliminating many of the numerous plants of the division or subkingdom Thallophya, lacking chlorophyll and ranging in form from a single cell to a body mass of branched filamentous hyphae. An all purpose fertilizer containing a 20-18-20 (nitrogen, phosphoric acid, potash) mix such as "Technigro" from Fison's Horticulture, Inc. of Warwick, N.Y. may also be employed. Numerous other chemical treatments for horticultural use could be employed with equal facility in the instant invention.

Some weeds, such as purple nut grass or sedge, are particularly pernicious and have been known to grow through and around the fine weave of many agrotextile materials employed to prevent their exit from the ground surface. To further enhance the ability of the instant invention in controlling such growth, a herbicide may be added in the manner hereinabove described. In this regard, pre-emergent herbicides such as s-ethyl dipropylthiocarbamate sold under the trademark "Eptam" by Voluntary Purchasing Groups, Inc., of Bonham, Tex. have proven particularly effective in checking the growth of such weeds.

It is to be understood that the present weed control device for potted plants is not limited to the embodiments described above, but encompasses any and all embodiments within the scope of the following claims.

I claim:

1. A weed control device for potted plants, comprising:
   a mat of porous construction adapted to fit within the open top of a pot and engage a side wall thereof for inhibiting weed growth by shading the pot interior from light; and, a retainer positioned atop said mat for holding said mat within the pot by applying a downward force principally about the periphery of said mat, said retainer having a substantially triangular cross-sectional configuration and including:
- a substantially vertical side surface for engaging the side wall of the pot;
- a substantially horizontal bottom surface normally extending from said side surface for engaging said mat; and,
- an inclined surface joining said side surface and said bottom surface.

2. The weed control device according to claim 1 wherein said mat is comprised of an agrotextile.

3. The weed control device according to claim 1 wherein said mat is crescent shaped for accommodating irregular plant growth within the pot.

4. The weed control device according to claim 1 wherein said mat has a circular outline for snugly engaging the side wall of the pot.

5. The weed control device according to claim 4 wherein said mat further includes two opposed radial edges separated by a radial cut extending from the outer edge of said mat inwardly therefrom.

6. The weed control device according to claim 5 wherein said mat further includes an inner edge describing a closed geometrical outline, said inner edge being intersected by said radial cut.

7. The weed control device according to claim 1, wherein said retainer further comprising:
two opposed end surfaces, establishing the respective lengths of said side, bottom, and inclined surfaces, positioned in a spaced-apart relationship, whereby said spaced-apart relationship may be varied by the application of a slight force to said opposed end surfaces.

8. A weed control device for potted plants comprising:
a mat of porous construction adapted to fit within the open top of a pot and engage a side wall thereof for inhibiting weed growth by shading the pot interior from light; and, a retainer positioned atop said mat for holding said mat within the pot by applying a downward force principally about the periphery of said mat, said retainer having an inverted U-shaped cross section integrally joined to the outer edge of said mat for frictionally securing said mat to the pot.

9. The weed control device according to claim 8 wherein said mat is comprised of a plurality of panels positioned in a side-by-side relationship so as to describe a thin, flat, circular configuration.

10. The weed control device according to claim 9 wherein said retainer ring includes an integral hinge in its outer surface for hingedly joining two of said plurality of panels together.

11. The weed control device according to claim 8, wherein
said mat is coated with a water soluble chemical.

12. The weed control device according to claim 11 wherein said water soluble chemical coating comprises a herbicide.

13. The weed control device according to claim 11 wherein said water soluble chemical coating comprises an insecticide.

14. The weed control device according to claim 11 wherein said water soluble chemical coating comprises a fungicide.

15. The weed control device according to claim 11 wherein said water soluble chemical coating comprises a fertilizer.

* * * * *